United States Patent
Karlsson et al.

(10) Patent No.: US 8,183,718 B2
(45) Date of Patent: May 22, 2012

(54) METHOD AND DEVICE FOR CONTROLLED RECLOSING OF A CIRCUIT BREAKER

(75) Inventors: Daniel Karlsson, Malmö (SE); Göran Runvik, Bara (SE)

(73) Assignee: ABB AB, Västerås (SE)

( * ) Notice: Subject to any disclaimer, the term of this patent is extended or adjusted under 35 U.S.C. 154(b) by 189 days.

(21) Appl. No.: 11/793,815

(22) PCT Filed: Dec. 22, 2005

(86) PCT No.: PCT/SE2005/002010
§ 371 (c)(1),
(2), (4) Date: Dec. 4, 2007

(87) PCT Pub. No.: WO2006/068614
PCT Pub. Date: Jun. 29, 2006

(65) Prior Publication Data
US 2008/0197715 A1      Aug. 21, 2008

(30) Foreign Application Priority Data
Dec. 22, 2004   (SE) .......................... 0403206

(51) Int. Cl.
*H02B 1/24*           (2006.01)

(52) U.S. Cl. .......................................... 307/125; 361/59

(58) Field of Classification Search .................... 307/125
See application file for complete search history.

(56) References Cited

U.S. PATENT DOCUMENTS

| | | | |
|---|---|---|---|
| RE28,490 E * | 7/1975 | Chen et al. ...................... | 361/71 |
| 4,994,934 A * | 2/1991 | Bouhenguel .................... | 361/71 |
| 5,319,514 A | 6/1994 | Walsh et al. | |
| 6,778,370 B1 * | 8/2004 | LaPlace et al. ................. | 361/71 |
| 2002/0080540 A1 * | 6/2002 | McElray et al. ................ | 361/59 |
| 2004/0051387 A1 | 3/2004 | Lasseter et al. | |
| 2005/0195538 A1 * | 9/2005 | Khoroshev et al. ............ | 361/42 |

FOREIGN PATENT DOCUMENTS

| EP | 1 217 709 A1 | 6/2002 |
|---|---|---|
| EP | 1 261 096 A1 | 11/2002 |

OTHER PUBLICATIONS

Prabha Kundur, *Power System Stability and Control*, Chapter 6.3 Transfer of Power Between Active Sources, 1994.
International Search Report—Mar. 29, 2006.
PCT/ISA/237—Written Opinion of the International Searching Authority—Mar. 29, 2006.

* cited by examiner

*Primary Examiner* — Fritz M Fleming
(74) *Attorney, Agent, or Firm* — Venable LLP; Eric J. Franklin

(57) ABSTRACT

A method for controlled reclosing of branch elements in an electric power system that has been subjected to a disturbance and that includes at least one branch element and at least one circuit breaker connected thereto. The angular difference between voltage vectors on both sides of the circuit breaker or at two end points of the branch element is detected and compared with a comparison value. In dependence on a magnitude of a deviation of the angular difference from the comparison value, the reclosing is either completed or blocked. The comparison value is updated automatically and regularly in such a way that an adaptive value is obtained. A system includes an element arranged to update the comparison value automatically and regularly in such a way that an adaptive value is obtained.

19 Claims, 4 Drawing Sheets

METHOD AND DEVICE FOR CONTROLLED RECLOSING OF A CIRCUIT BREAKER

CROSS-REFERENCE TO RELATED APPLICATIONS

Figure 1:
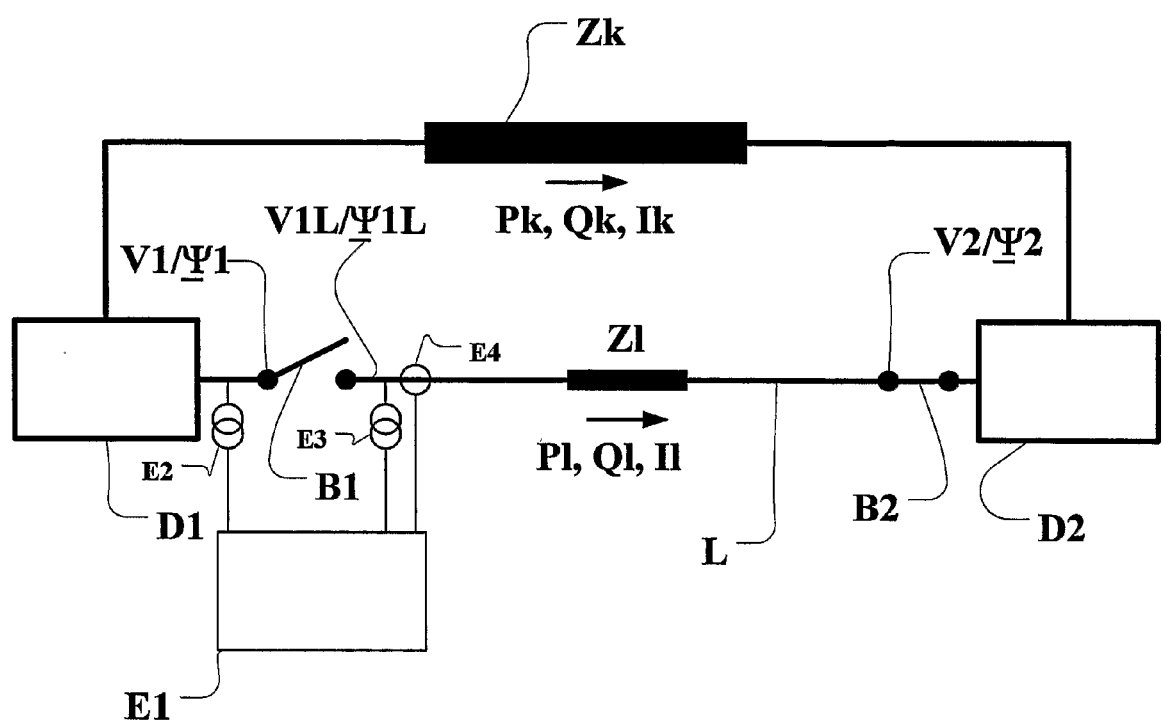

This application claims priority to Swedish patent application 0403206-6 filed 22 Dec. 2004 and is the national phase under 35 U.S.C. §371 of PCT/SE2005/002010 filed 22 Dec. 2005.

TECHNICAL FIELD

The present invention relates to a method and a system for controlled automatic reclosing of branch elements such as, for example, a line, in an electric power system that has been exposed to a disturbance. The invention particularly relates to a method in which the angular difference between the voltage vectors on both sides of the circuit breaker, or at both end points of the line, is detected and compared with a comparison value, and, in dependence on the magnitude of the deviation of said angular difference from the comparison value, said reclosing is either completed or blocked. The system comprises electronic measurement and control equipment intended to be used in an electric power system.

BACKGROUND OF THE INVENTION AND PRIOR ART

It is known that an electric power system is planned and designed for normal, as well as disturbed, operation with respect to fixed dimensioning criteria relating to system quantities and power transmissions. The angular difference between voltage vectors in various parts of the electric power system is one such quantity. This angular difference is a measure of the transmitted active power and a measure of the margin of stability of the system.

When a disturbance arises in an electric power system, for example a short circuit or a ground fault, which leads to disconnection of one or more branch elements, for example a line, for the arc at the site of the fault in case of a transient fault to expire and the fault disappear, automatic reclosing is often used, with amplitude, frequency and angular position control of the voltage across the circuit breaker in question [Kundur, Power System Stability and Control, ISBN 0-07-035958-X, p. 922] In order for reclosing to be allowed, the differences between the values for these respective quantities, on both sides of the circuit breaker, must be smaller than certain predetermined values/criteria. The method is called controlled reclosing with synchronism control. The purpose of rapidly reclosing the line, after the arc has been extinguished and the site of the fault deionized, is to promote stability and reduce the risk of an out-of-phase situation; alternatively, a higher stationary-operation transfer of power is allowed. If the difference in amplitude, frequency or phase position between the voltages on both sides of the circuit breaker should be too great and connection of the circuit breaker is performed, there is a risk of such high transient stresses that equipment may become damaged and/or that the operation of the electric power system is further disturbed. Synchronism control is used to block the reclosing in those cases where the voltages on both sides of the circuit breaker differ by more than a certain value with respect to amplitude, frequency or phase position.

The angular difference between the voltage vectors on both sides of the circuit breaker is compared, in the present equipment, with a fixed set value only. In the case of large power transmissions prior to a fault and disconnection of the line under consideration, the angular difference between the ends of the lines is relatively great also during stationary operation. After the circuit breakers, initiated by the relay protection devices, have disconnected the line at its end points, the power flow in a masked system is forced to take other directions, which further increases the transfer angle. The automatic reclosing system is started at the two ends of the line by the released line protection devices. Thereafter, after checking that the line is dead, the faulty line is first reclosed at the opposite end. The angular difference across the breaker poles of the circuit breaker under consideration will then be relatively great since the angle is not changed along the energized, but unloaded, line. Consequently, there is a considerable probability that too great an angular difference exists/is measured across the poles of the circuit breaker under consideration, and the reclosing operation will then be blocked.

A recent example of the sequence of events described above is the major blackout in Italy on 28 Sep. 2003 [Interim Report of the Investigation Committee on the 28 Sep. 2003 Blackout in Italy, UTCE Report—27 Oct. 2003], where a failing reclosing contributed to the uncontrolled sequence and propagation of the disturbance. The limit to the angular difference across the breaker poles, to allow reclosing, was at that time set at 30°, which blocked the reclosing, resulting in the most extensive electricity blackout in the world so far.

OBJECTS AND MOST IMPORTANT CHARACTERISTICS OF THE INVENTION

One object of the invention is to provide a method for reclosing of lines in an electric power system that has been subjected to a disturbance, which minimizes the risk of failure or continued serious disturbance of the operation.

Another object of the invention is to provide an adaptive comparison value, or comparison variable, with which the angle across the breaker poles is compared before reclosing. The adaptive comparison variable is based on an estimation of the angular difference across the line during stationary operation, after reclosing has occurred and any transients have decayed.

The above and other objects are achieved according to the invention by a method and by a system as well as by a computer program.

According to a preferred embodiment of the invention, the reclosing is achieved in that the measured angular difference between the voltage vectors on both sides of the circuit breaker in question is not only compared with a fixed, set comparison value but also with an estimated/calculated comparison value based on the future angular difference in stationary operation between the two end points of the line, after the line has been reclosed. Depending on the magnitude of the deviation of this angular difference from the limit value/comparison value, said reclosing is either completed when there is a small risk of failure of equipment or of disturbance of operation, or blocked when there is a considerable risk of failure of equipment or disturbance of operation, whereby said comparison value is automatically updated, so as to provide a better base for a decision whether to complete or block, compared with a fixed, or manually updated, limit value.

The extent of the transients that arise in the electric power system, and which may damage equipment and disturb operation in some other way, is determined by the angular difference across the breaker poles before connection and the angular difference across the line after the line has been connected and stationary operation has commenced.

In another preferred embodiment of the invention, an estimated value of the angular difference between the voltage vectors across the line is regularly updated, for example every second, after the line has been disconnected as a result of a fault and then connected again after amplitude control, frequency control and phase-position control of the voltages on both sides of the circuit breaker. In a first approximation, it is assumed that the angular difference between the voltage vectors at the two end points of the line, after the reclosing, is the same as before the fault. The angle thus estimated is then obtained from the following known relationship [Kundur, Power System Stability and Control, ISBN 0-07-035958-X, p 251]:

$$P = RE[V_1 \cdot I_1^*] = \left[\frac{|V_1| \cdot |V_2|}{X}\right]\sin(\Psi) = \left[\frac{|V_1| \cdot |(V_1 - I_1 \cdot X)|}{X}\right]\sin(\Psi),$$

where

P=active power transited across the line;
$V_1$=complex voltage at transmitter end of the line;
$I_1$=complex current out on the line;
$|V_1|$=RMS value of the voltage at transmitter end;
$|V_2|$=RMS value of the voltage at receiver end;
X=longitudinal reactance of the line under consideration (the resistance being omitted);
$\Psi$=angle between voltage vectors at the two end points of the line.

Let us assume that the adaptive synchro-check function under consideration is installed at the transmitter end of the line (the reasoning is fully analogous for the receiver end). The line reactance, X, is a known parameter and the line power, P, is calculated based on measured values of the voltage, $|V_1|$, and current out on the line, $|I_1|$, as well as the phase angle between current and voltage, $\phi$, according to:

$$P=|V_1|\cdot|I_1|\cos(\phi).$$

According to another embodiment, the invention comprises a computer program that controls a computer or a computer process to control or simulate a method for adaptive synchro-check in an electric power system in accordance with the invention.

In still another embodiment of the invention, a computer program is arranged to control a computer or a computer process to control or simulate a method for adaptive synchro-check in an electric power-system in accordance with the invention, recorded or stored on one or more computer-readable media.

Further developments of the invention are comprised by the scope of the following description, claims and abstract.

BRIEF DESCRIPTION OF THE ACCOMPANYING DRAWINGS

Figure 2:
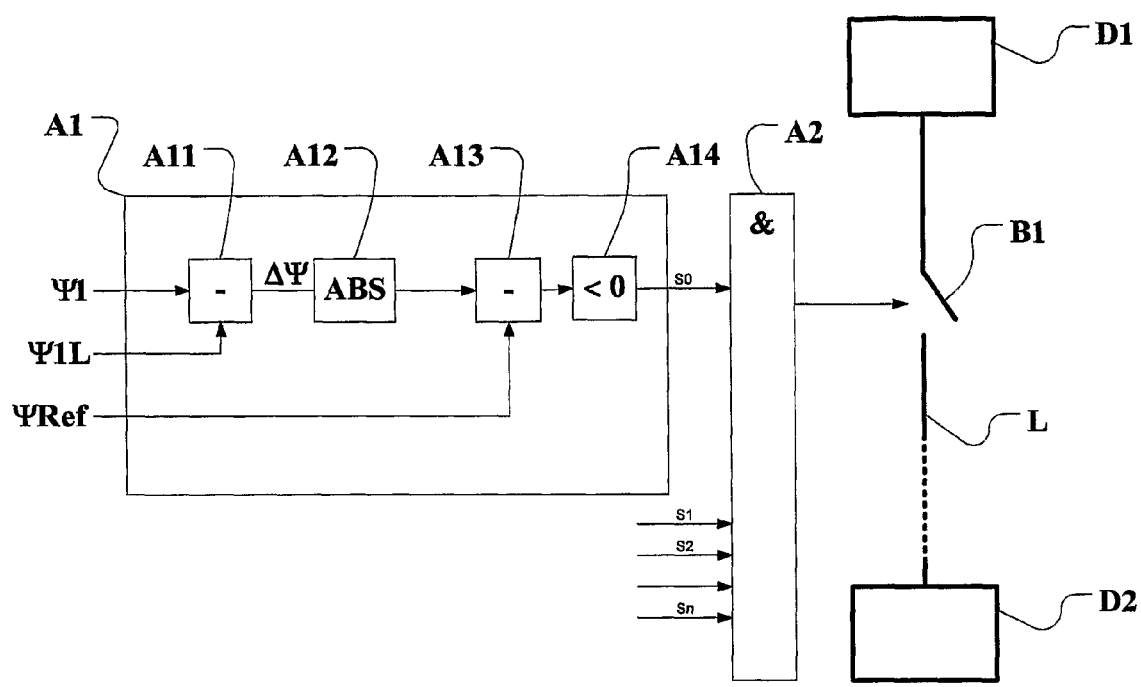
Figure 3:
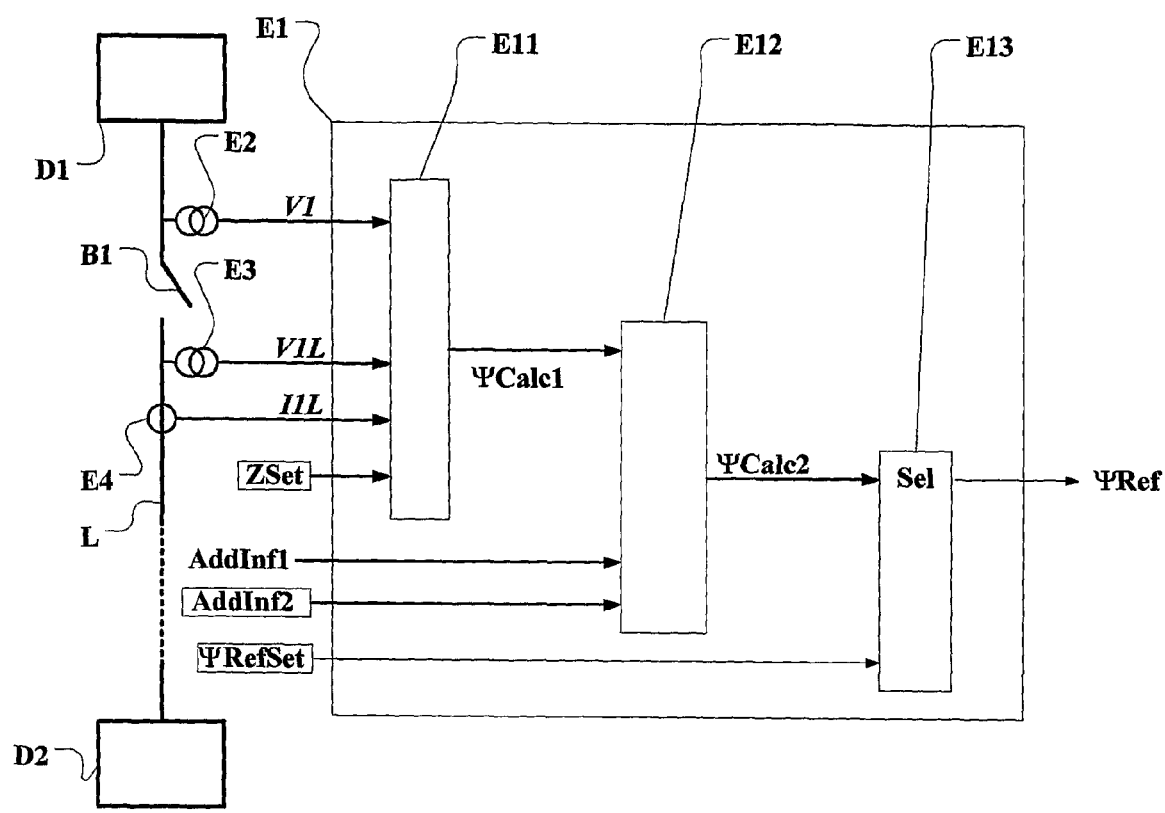
Figure 4:
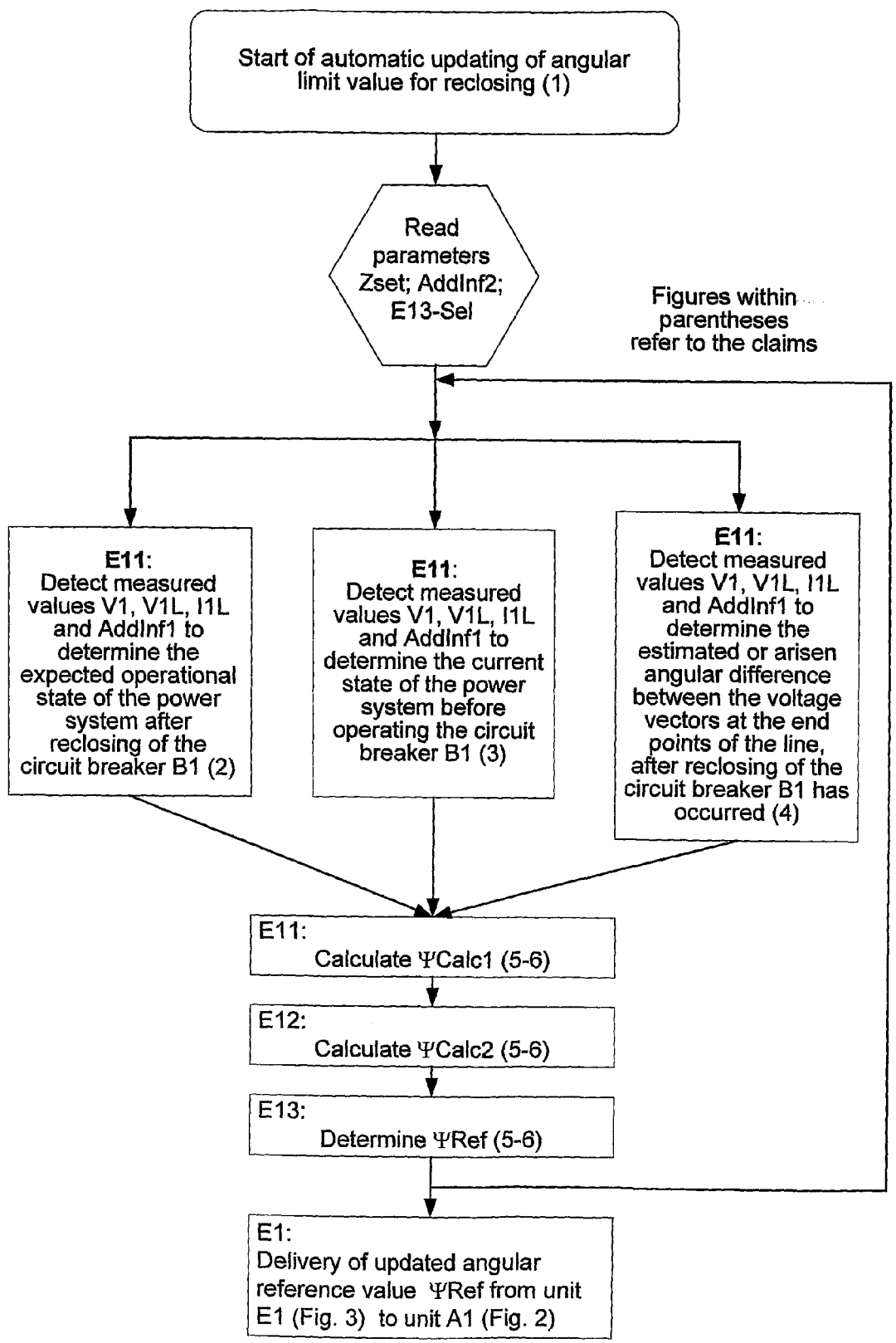

The invention will be described in greater detail below with reference to the accompanying figures, wherein FIG. 1 shows an electric power system comprising two sub-systems and a connection between the sub-systems via an equivalent branch element, FIG. 2 shows an embodiment of the angle-sensing part of an automatic reclosing system comprising a difference element for calculating the difference between the measured angles for the voltage vectors on both sides of the circuit breaker, FIG. 3 shows an embodiment of the invention as a single-line diagram and as a block diagram comprising a unit for determining the reference angle, and FIG. 4 shows an embodiment of the invention as a flow diagram based on the components in FIG. 3.

DESCRIPTION OF PREFERRED EMBODIMENTS

In the following, both the method and the device according to the invention will be described.

The device according to the invention comprises a plurality of members/means, shown in the figures as flow diagrams and block diagrams. The block diagrams may be interpreted both as a signal-flow diagram and a block diagram describing equipment for the device. A function carried out in a flow diagram or by a block, shown in the block diagram, may in applicable parts be implemented by analog and/or digital technique but is advantageously carried out as programs in a microprocessor, in a computer program, or as a computer program code element carried out in a computer or in a computer process.

It is to be understood that when the flows and blocks shown in the figures are referred to in a physical embodiment as devices, apparatuses, etc., they should be conceived as means for achieving a desired function, in particular when the function is implemented as software in a microprocessor. Consequently, as the case may be here, the expression "signal" may also be interpreted as a value generated by a computer program and also appear in this form only. The blocks below are only described as a function since they may be easily implemented, in a manner known per se, by a person skilled in the art.

In order no to burden the description with distinctions which are self-explanatory to a person skilled in the art, in the following the same designations are generally used for the quantities that occur in lines, in automatic devices and in calculating units as for the measured values and signals/calculated values which correspond to these quantities and which are supplied to and treated in the reclosing device described below.

FIG. 1 shows an electric power system comprising two sub-systems D1 and D2, respectively, a connection between the sub-systems via an equivalent branch element with the impedance Zk, a line L with the longitudinal impedance Z1, which has its end points in the respective sub-system, and two circuit breakers B1 and B2, respectively, at the two end points of the line. Further, the flows of active and reactive power and current are designated Pk, Qk, Ik and P1, Q1, I1, respectively, in the connection branch and in the line under consideration. The amounts of the voltages and the phase angle at the end points of the line, respectively, in the respective sub-system are designated V1/V2 and $\Psi1/\Psi2$, respectively, where the phase angles are related to an arbitrary, common reference. The corresponding quantities on the line side of the circuit breaker B1 are marked V1L and $\Psi1L$, respectively. The voltages on the respective side of the circuit breaker B1 are measured with the voltage trans-formers E2 and E3, respectively, and the line current is measured with current transformer E4. The secondary sides of the instrument transformers are connected to the unit E1 for calculating the reference angle $\Psi$ref.

FIG. 2 shows an embodiment of the phase-angle-sensing part of an automatic reclosing system A1, according to the prior art as a single-line diagram and a block diagram, comprising a difference element A11 for calculating the difference $\Delta\Psi$ between the measured angles $\Psi1$ and $\Psi1L$ for the voltage vectors on both sides of the circuit breaker B1, an absolute-value-forming element A12, another difference-forming element A13, which calculates the difference between the absolute values of ΔΨ and the reference angle ΨRef, as well as a level-sensing element A14 which checks if the output value from A13 is less than zero. The output signal from the automatic reclosing system is a binary signal, which is 1 if the absolute values of ΔΨ are smaller than the reference angle ΨRef, and otherwise 0. The binary output signal from the automatic reclosing system enters as an AND condition S0 into the reclosing logic unit A2, for ON operation of the circuit breaker B1, which recloses the line L. Other inputs to the AND condition A2, for connection of the circuit breaker B1, are designated S1 ... Sn.

FIG. 3 shows an embodiment of the invention in the form of a single-line diagram and a block diagram, comprising a unit for determining the reference angle ΨRef E1, wherein one or more of the components E11, the first calculating step E12, the second calculating step and E13, the choice of limit value, may be included. In the first calculating step, a value ΨCalc1 is determined based on the set line reactance ZSet, the measured current I1L, and voltage V1L, on the line side of the circuit breaker B1, as well as any measured voltage V1, of a busbar connected to the breaker. The calculation may be further refined in the calculating unit E12, where measured data from other parts of the power system are supplied AddInf1, as well as any parameter-based information AddInf2. In the last step E13, a choice is made in the functional block Se1 whether the fixed set value ΨRefSet, or the calculated value ΨCalc2, should be given to the output quantity ΨRef.

FIG. 4 shows an embodiment of the invention in the form of a flow diagram, based on the components in FIG. 3. The automatic updating of the angle-limit value for reclosing is started in some way. Thereafter, there are read parameters for line data, ZSet, additional information in parameter form, AddInf2, for calculating the reference angle, ΨRef, and a parameter for choice of a method for determining ΨRef, a fixed parameter value, ΨRefSet, or a calculated value, ΨCalc2. After this, the measured values V1, VIL, I1L and AddInf1 are detected. Then the calculations of ΨCalc1 and ΨCalc2 are made, based on any of the following criteria the expected operational state of the power system, after reclosing of the circuit breaker B1, the current state of the power system prior to switching on the circuit breaker B1, or the estimated or the actually arisen angular difference between the voltage vectors at the end points of the line after reclosing of the circuit breaker B1 has occurred.

Finally, the reference angle ΨRef is determined. After the reference angle has been determined in this way, the updated value of ΨRef is delivered to the calculating unit A1, in FIG. 2. Thereafter, the sequence is repeated as from the detection of the measured values V1, V1L and I1L.

The above invention has been described with reference to a few different preferred embodiments. The invention is not, of course, limited to these embodiments but a plurality of other variants of embodiments are fully feasible within the scope of protection of the patent.

The invention claimed is:

1. A method for controlled reclosing of at least one line connected between two sub-systems of an electric power system that has been subjected to a disturbance and which line has been opened as a result of the disturbance, the at least one line having at least one circuit breaker connected thereto, the two sub-systems of the electric power system being connected by at least one branch element, the method comprising:

determining an angular difference between voltage vectors on both sides of the at least one circuit breaker or at end points of the at least one branch element;

calculating an adaptive comparison value based on an estimation of a future angular difference between the sides of the at least one circuit breaker or end points of the at least one branch element during stationary operation after reclosing the at least one line, wherein the comparison value is based on an expected state after reclosing or an operational state before the opening;

comparing the determined angular difference with the adaptive comparison value;

completing or blocking reclosing of the at least one line in dependence on a magnitude of a deviation of the determined angular difference from the adaptive comparison value; and regularly calculating and automatically updating the adaptive comparison value based on the angle between the voltage vectors at the two end points of the branch element after reclosing of a disconnected branch element so that an adaptive value is obtained.

2. The method according to claim 1, wherein the adaptive comparison value is calculated based on the calculation/estimation of the angular difference between the voltage vectors at the end points of the at least one branch element that is expected to arise after any transients caused by switching have decayed.

3. The method according to claim 1, wherein a degree of a transient caused by switching is determined by the angular difference between the voltage vectors at the end points of the at least one branch element before connection and an angular difference between the voltage vectors at the end points of the at least one branch element after the at least one line has been reclosed.

4. A method for controlled reclosing of at least one line for connecting two sub-systems of an electric power system that has been subjected to a disturbance and which line has been opened as a result of the disturbance, the at least one line having at least one circuit breaker connected thereto, the two sub-systems of the electric power system being connected by at least one branch element, the method comprising:

determining an angular difference between voltage vectors on both sides of the at least one circuit breaker or at end points of the at least one branch element;

calculating an adaptive comparison value based on an estimation of a future angular difference between the sides of the at least one circuit breaker or end points of the at least one branch element during stationary operation after reclosing the at least one line, wherein the comparison value is based on an operational state before opening;

comparing the determined angular difference with the adaptive comparison value;

completing or blocking the reclosing of the at least one line in dependence on the magnitude of a deviation of the determined angular difference from the adaptive comparison value; and regularly calculating and automatically updating the adaptive comparison value based on the angle between the voltage vectors at the two end points of the branch element.

5. The method according to claim 4, wherein the adaptive comparison value is determined to be updated by estimation/calculation of the angular difference between the voltage vectors at the end points of the at least one branch element that is expected to arise after reclosing of the at least one line has occurred.

6. The method according to claim 4, wherein the adaptive comparison value is determined to be updated by the calculation/estimation of the angular difference between the voltage vectors at the end points of the at least one branch element that is expected to arise after reclosing of the at least one line has occurred and any transients caused by switching have decayed.

7. The method according to claim 4, wherein a degree of a transient caused by switching is determined by the angular difference between the voltage vectors at the end points of the at least one branch element before connection and an angular difference between the voltage vectors at the end points of the at least one branch element after the at least one line has been reclosed.

8. A system for controlled reclosing of at least one line for connecting two sub-systems of an electric power system that has been subjected to a disturbance and which line has been opened as a result of the disturbance, the at least one line having at least one circuit breaker connected thereto, and the two sub-systems of the electric power system being connected by at least one branch element, the system comprising:
a unit configured to determine an angular difference between voltage vectors on both sides of the at least one circuit breaker or at two end points of the at least one branch element;
a calculation unit configured to calculate an adaptive comparison value based on an estimation of a future angular difference between the sides of the at least one circuit breaker or end points of the at least one branch element during stationary operation after reclosing the at least one line, wherein the comparison value is based on an expected state after closing; and
a comparison unit configured to compare the determined angular difference with the adaptive comparison value, wherein in dependence on a magnitude of a deviation of the angular difference from the adaptive comparison value, the system either completes or blocks reclosing of the at least one line,
wherein the calculation unit is configured to regularly calculate and automatically update the adaptive comparison value based on the angle between the voltage vectors at the two end points of the branch element after reclosing of the disconnected branch element so that an adaptive value is obtained.

9. The system according to claim 8, further comprising:
a unit configured to determine whether or not the estimated/calculated adaptive comparison value is updated by the estimation of the angular difference between the voltage vectors at the end points of the at least one branch element that is expected to arise after reclosing of said line has occurred.

10. The system according to claim 8, further comprising:
a unit configured to determine whether or not the estimated/calculated adaptive comparison value is updated by the estimation of the angular difference between the voltage vectors at the end points of the at least one branch element that is expected to arise after reclosing of said line has occurred and any transients caused by switching have decayed.

11. The system according to claim 8, further comprising:
a unit configured to determine a degree of a transient caused by switching is determined by the angular difference between the voltage vectors at the end points of the at least one branch element before connection and the angular difference between the voltage vectors at the end points of said branch element after the at least one line has been reclosed.

12. A system for controlled reclosing of at least one line for connecting two sub-systems of in an electric power system that has been subjected to a disturbance and which line has been opened as a result of the disturbance, the at least one line having at least one circuit breaker connected thereto, and the two sub-systems of the electric power system being connected by at least one branch element, the system comprising:
a module configured to determine an angular difference between voltage vectors on both sides of the at least one circuit breaker or at two end points of the at least one branch element;
a calculation module configured to calculate an adaptive comparison value based on an estimation of a future angular difference between the sides of the at least one circuit breaker or end points of the at least one branch element during stationary operation after reclosing the at least one line, wherein the comparison value is based on an operational state before opening; and
a comparison module configured to compare the determined angular difference with the adaptive comparison value, wherein in dependence on a magnitude of a deviation of the angular difference from the adaptive comparison value, the system either completes or blocks reclosing of the at least one line,
wherein the calculation module is configured to regularly calculate and automatically update the adaptive comparison value based on the angle between the voltage vectors at the two end points of the branch element before disconnection of the at least one branch element so that an adaptive value is obtained.

13. The system according to claim 12, further comprising:
a module configured to determine whether or not the estimated/calculated adaptive comparison value is updated by the estimation of the angular difference between the voltage vectors at the end points of the at least one branch element that is expected to arise after reclosing of said line has occurred.

14. The system according to claim 12, further comprising:
a module configured to determine whether or not the estimated/calculated adaptive comparison value is updated by the estimation of the angular difference between the voltage vectors at the end points of the at least one branch element that is expected to arise after reclosing of said line has occurred and any transients caused by switching have decayed.

15. The system according to claim 12, further comprising:
a module configured to determine a degree of a transient caused by switching is determined by the angular difference between the voltage vectors at the end points of the at least one branch element before connection and the angular difference between the voltage vectors at the end points of said branch element after the at least one line has been reclosed.

16. A computer program product, comprising:
a non-transitory computer readable medium; and
computer program instructions recorded on the non-transitory computer readable medium and executable by a processor for carrying out a method for controlled reclosing of at least one line connecting two —subsystems of an electric power system that has been subjected to a disturbance and which line has been opened as a result of the disturbance, the at least one line having at least one circuit breaker connected thereto, and the two sub-systems of the electric power system being connected by at least one branch element, the method comprising:

determining an angular difference between voltage vectors on both sides of the at least one circuit breaker or at end points of the at least one branch element;

calculating an adaptive comparison value based on an estimation of a future angular difference between the sides of the at least one circuit breaker or end points of the at least one branch element during stationary operation after reclosing the at least one line, wherein the comparison value is based on an expected state after reclosing;

comparing the determined angular difference with the adaptive comparison value;

completing or blocking reclosing of the at least one line in dependence on a magnitude of a deviation of the determined angular difference from the adaptive comparison value; and regularly calculating and automatically updating the adaptive comparison value based on the angle between the voltage vectors at the two end points of the branch element after reclosing of a disconnected branch element so that an adaptive value is obtained.

17. The computer program product according to claim 16, wherein the computer program instructions are further for transmitting the computer program instructions at least in part via a local or global network.

18. A computer program product, comprising:
a non-transitory computer readable medium; and
computer program instructions recorded on the non-transitory computer readable medium and executable by a processor for carrying out a method for controlled reclosing of at least one line for connecting two sub-systems of an electric power system that has been subjected to a disturbance and which line has been opened as a result of the disturbance, the at least one line having at least one circuit breaker connected thereto, and the two sub-systems of the electric power system being connected by at least one branch element, the method comprising determining an angular difference between voltage vectors on both sides of the at least one circuit breaker or at end points of the at least one branch element;

calculating an adaptive comparison value based on an estimation of a future angular difference between the sides of the at least one circuit breaker or end points of the at least one branch element during stationary operation after reclosing the at least one line, wherein the comparison value is based on an operational state before the opening;

comparing the determined angular difference with the adaptive comparison value;

completing or blocking the reclosing of the at least one line in dependence on the magnitude of a deviation of the determined angular difference from the adaptive comparison value; and regularly calculating and automatically updating the adaptive comparison value based on the angle between the voltage vectors at the two end points of the branch element.

19. The computer program product according to claim 18, wherein the computer program instructions are further for transmitting the computer program instructions at least in part via a local or global network.

* * * * *